(12) United States Patent
Kwak et al.

(10) Patent No.: US 7,710,717 B2
(45) Date of Patent: May 4, 2010

(54) BUFFER FOR DISK DRIVE AND DISK DRIVE ASSEMBLY HAVING THE SAME

(75) Inventors: Dong Ok Kwak, Suwon-si (KR); Ki Taek Kim, Yongin-si (KR); Jin Woo Cho, Seongnam-si (KR); Seong Woon Booh, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 735 days.

(21) Appl. No.: 11/395,259

(22) Filed: Apr. 3, 2006

(65) Prior Publication Data

US 2007/0014087 A1 Jan. 18, 2007

(30) Foreign Application Priority Data

Jul. 18, 2005 (KR) .................. 10-2005-0064914

(51) Int. Cl.
*G06F 1/16* (2006.01)
(52) U.S. Cl. .................. 361/679.33; 720/601; 711/114; 360/246.3; 369/292
(58) Field of Classification Search ......... 361/679–687, 361/724–727; 720/601, 694; 711/103, 114; 370/429; 360/97.02, 246.3; 369/53.36, 292
See application file for complete search history.

(56) References Cited

U.S. PATENT DOCUMENTS

| | | | |
|---|---|---|---|
| 5,349,486 A | 9/1994 | Sugimoto et al. | |
| 5,400,196 A | 3/1995 | Moser et al. | |
| 7,172,330 B2 * | 2/2007 | Lee et al. | ..... 362/634 |
| 2004/0179333 A1 * | 9/2004 | Xu | ..... 361/685 |
| 2007/0014086 A1 * | 1/2007 | Kim et al. | ..... 361/685 |
| 2007/0230106 A1 * | 10/2007 | Yeh | ..... 361/685 |
| 2007/0263351 A1 * | 11/2007 | Ho et al. | ..... 361/685 |
| 2009/0256031 A1 * | 10/2009 | Harita | ..... 248/27.1 |

FOREIGN PATENT DOCUMENTS

| | | |
|---|---|---|
| JP | 04-368690 | 12/1992 |
| JP | 11-037198 | 2/1999 |
| JP | 2003-249069 | 9/2003 |
| JP | 2004-134036 | 4/2004 |
| JP | 2004-247046 | 9/2004 |
| JP | 2004-332868 | 11/2004 |
| JP | 2004-334959 | 11/2004 |
| JP | P2005-18835 A * | 1/2005 |
| KR | 20-1990-0013252 | 7/1990 |
| KR | 20-1990-013252 | 7/1990 |

OTHER PUBLICATIONS

Korean Office Action, dated Sep. 20, 2006, for corresponding Korean Application No. 10-2005-006491.
Abstract only of Korean Publication No. 20-1990-0013252.

* cited by examiner

*Primary Examiner*—Hung V Duong
(74) *Attorney, Agent, or Firm*—Staas & Halsey LLP

(57) ABSTRACT

A buffer to be used with a disk drive, the buffer including a main body provided to the disk drive; one or more protrusions extending from an inner or outer surface of the main body; and one or more inner spaces corresponding to the respective protrusions; wherein the inner spaces are formed on an apposite surface of the main body to the protrusions.

25 Claims, 7 Drawing Sheets

(a)

(b)

BUFFER FOR DISK DRIVE AND DISK DRIVE ASSEMBLY HAVING THE SAME

CROSS-REFERENCE TO RELATED APPLICATIONS

This application claims the benefit of Korean Patent Application No. 2005-64914, filed on Jul. 18, 2005, in the Korean Intellectual Property Office, the disclosure of which is incorporated herein by reference.

BACKGROUND OF THE INVENTION

1. Field of the Invention

The present invention relates to a buffer, and, more particularly, to a buffer to be used in a disk drive, which may effectively protect a disk drive from impact by its excellent buffering ability, and also be manufactured in a minimal size, and a disk drive assembly including the same.

2. Description of the Related Art

A disk drive is a type of auxiliary memory device. Typical disk drives may include a hard disk drive or an optical disk drive used to read and record data stored in a magnetic or optical disk by a magnetic or optical head. For stable input of data, it is important that vibration occurring inside or outside of a disk drive is prevented or controlled, and research regarding the prevention and/or control of this vibration is actively being pursued.

A disk drive generally includes a motor to rotate a disk, and an actuator having a head used to record data to the disk and read the data recorded on the disk. An internal vibration may occur due to the motor and/or the actuator included in the disk drive. A vibration blocking mount may be used to solve this problem, thereby minimizing the rotation vibration factor caused by inner spindle force, as disclosed in U.S. Pat. No. 5,400,196. However, vibration introduced from an external source may still not be prevented.

As described above, a matter of greater concern than internal vibration is a vibration caused by an external impact. As disk drives become smaller and lighter so that they may be attached to portable devices, vibration caused by an external impact becomes a more serious matter. The external impact may cause damage to a disk drive, such as the dislocation of the rotation center of a disk, damage to the disk, interference to the normal operation of the motor, interference in reading recorded information, and magnetic or physical destruction of the recorded information.

Currently, an ultra slim disk drive is considered to be the optimal storage medium since it is cheaper than a general flash memory device with comparable capacity, and the power consumption is less than 1 W, which makes it possible to be installed in a portable device. Currently, an ultra slim disk drive is generally utilized by a portable device, and, more particularly, to a multi-media player such as an MP3 player and PMP. An ultra slim disk drive has been developed which has a thickness that has been reduced to less than 1 inch. A product whose thickness is approximately 1 inch could be, for example, an MP3 player or PMP, and a product whose thickness is less than approximately 1 inch may be applicable to, for example, a wireless AP, PDA, or navigational system.

As described above, the application range of an ultra slim disk drive is becoming extensive, but research regarding a method of protecting the disk drive from vibration due to an external impact has been thus far largely unsatisfactory. In a case in which a disk drive is installed in a portable device, since an external impact acceleration is generally not less than 5000 G, a method of protecting the disk drive from an external impact is essential. In the case in which a disk drive is installed in a portable device, vibration and impacts occur more frequently and with greater intensity than when installed in a personal computer. With a portable device, there is the problem of not installing an effective amount of buffer material, or the vibration blocking mount may not be properly installed due to the limitation of the size and weight of the disk drive.

In FIG. 1, a method of installing a vibration absorbing element different from a vibration blocking mount is illustrated. FIG. 1 illustrates a cross-sectional view of a vibration absorbing element disclosed in U.S. Pat. No. 5,349,486 (hereinafter referred to as the '486 patent). As illustrated, a magnetic disk 11 having a magnetic head 12 and a head arm 13 is surrounded by an enclosure 14 and vibration absorbing elements 15a, 15b, and 15c are interposed between the enclosure 14 and a frame 16 installed at the outer wall of the enclosure 14. In the '486 patent, it is disclosed that a spindle center 17, a shaft center 19 of an actuator, a center of gravity 20 of the enclosure 14, and rigidity factors Kc and Ks for each direction of each of vibration absorbing elements 15a, 15b, and 15c are designed via a dynamical design by using distances L1 through L5. In FIG. 1, an identifier $r_{pos}$ that is not described is the distance from the rotation center of the actuator to the tip of the magnetic head 12.

The absorbing element described above may be possible to design, but also may be difficult to manufacture, and the manufacturing cost may increase in the case in which the absorbing element is manufactured in a small size to control the vibration of a disk drive. Also, since the installation space is not large in the case of an ultra slim disk drive, the use of the '486 patent design may be undesirable. In the case in which a buffer having a maximum compressibility of approximately 30%, such as a rubber, is used, if the design is in the preferably small size, a space of at least 1.5 mm is required. According to Hooke's law, the rigidity is in inverse proportion to the thickness.

Also, a method of controlling an undesirable vibration of a disk drive by using a sensor, a servo algorithm, and an inertia generator in order to protect the disk drive from an impact may be considered, but it is not suitable to install an additional device for controlling vibration in an ultra slim drive. Namely, since there are limitations regarding installation space, size, and weight as characteristics of a portable device, this is not a desirable solution.

SUMMARY OF THE INVENTION

To solve the above described and/or other problems, the present invention provides a buffer that can effectively protect a disk drive from an external impact, and a disk drive assembly including the buffer.

The present invention also provides a buffer having a small enough size and weight to be utilized with an ultra slim disk drive, and a disk drive assembly including the buffer.

The present invention also provides a buffer that embodies a low rigidity and has an improved buffer function by reducing the natural frequency, and a disk drive assembly including the buffer.

Additional aspects and/or advantages of the invention will be set forth in part in the description which follows and, in part, will be apparent from the description, or may be learned by practice of the invention.

According to an aspect of the present invention, a buffer to be used with a disk drive is provided, the buffer including a main body attached to the disk drive; and a plurality of protrusions on the main body protruding in one direction, wherein inner spaces are respectively formed on opposite sides of the protrusion.

The protrusions may be formed on the inner surface or outer surface of the main body. The protrusions may be formed in various shapes, such as a hemisphere, a hexahedron, or another polyhedron. Also, the protrusions may be formed in a shape of a hemicylinder. Also, the protrusions may be formed in a combination of these shapes.

The inner spaces of the protrusion may be formed in various shapes such as hemispheres, polyhedrons, hemicylinders, or a combination thereof. The inner spaces of the protrusions may be formed in the same shapes as the protrusions so that the thickness of the buffer is approximately uniform.

The main body may have an attachment area in a shape corresponding to a corner of the disk drive, and may be attached to the corner to substantially cover the corner, and may be formed of plastic. The main body and the protrusions may be manufactured using injection molding.

According to another aspect of the present invention, a disk drive assembly is provided which includes: a disk drive; a bracket containing the disk drive; and a buffer provided to the disk drive, portions of which are protruded in an inner or outer direction whereby inner spaces are respectively formed opposite to the protrusions, the buffer being in contact with the bracket.

The protrusions of the buffer may be formed in the shape of a hemisphere, and the inner space of the protrusions may also be formed in the shape of a hemisphere. The shape of the protrusions may be identical to the inner spaces so that the thickness of the buffer is approximately uniform. The protrusions of the buffer may be in the shape of a hemicylinder, and the inner space may be formed in the same shape.

According to another aspect of the present invention, there is provided a buffer to be used with a disk drive, including a main body provided to the disk drive; one or more protrusions extending form an inner or outer surface of the main body; and one or more inner spaces corresponding to the respective protrusions; wherein the inner spaces are formed on an opposite surface of the main body to the protrusions.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
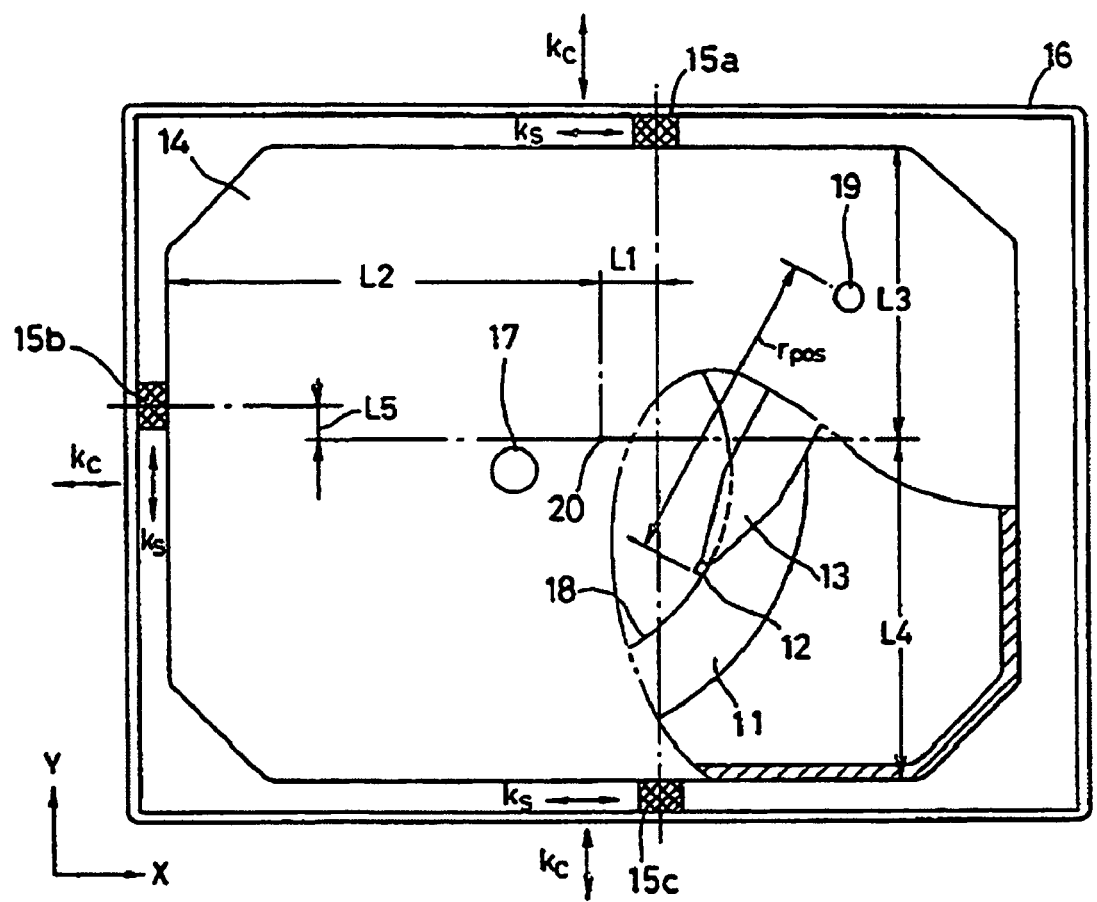
FIG. 1 illustrates a cross-sectional view of a disk drive disclosed in U.S. Pat. No. 5,349,486.

Reference will now be made in detail to the embodiments of the present invention, examples of which are illustrated in the accompanying drawings, wherein like reference numerals refer to the like elements throughout. The embodiments are described below to explain the present invention by referring to the figures. Although the embodiments are numbered for easier understanding in these descriptions, the numbers do not indicate any order of preference regarding the embodiments.

Embodiment 1

Figure 2:
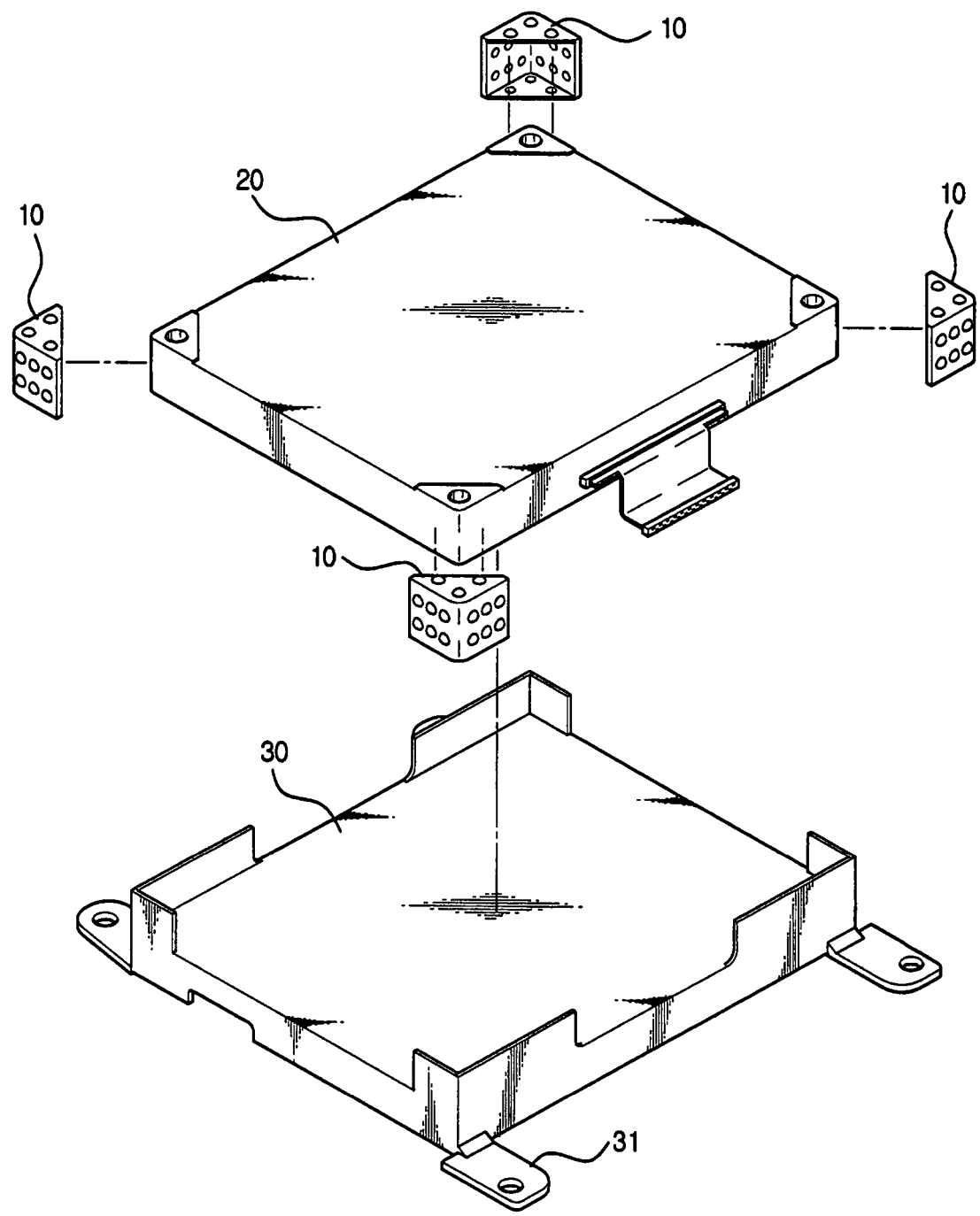
FIG. 2 is a perspective view illustrating a disk drive assembly according to a first embodiment of the present invention.
Figure 3:
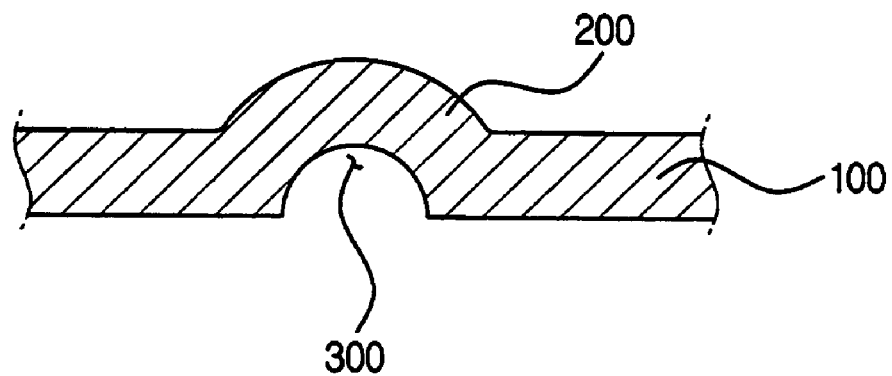
FIG. 3 is a cross-sectional view illustrating a protrusion according to the first embodiment of the present invention.

FIG. 2 is a perspective view illustrating a disk drive assembly according to the first embodiment of the present invention, and FIG. 3 is a cross-sectional view illustrating a protrusion according to the first embodiment of the present invention. As illustrated, the disk drive assembly of the present invention includes a disk drive 20, a bracket 30, and a buffer 10. The buffer 10 of this embodiment includes a main body 100 and a protrusion 200. The disk drive 20 equipped with the buffer 10 is provided in the bracket 30, and the bracket 30 may be fixed to an external apparatus via a fastening portion 31.

Since the main body 100 of the buffer 10 is respectively attached to each corner of the disk drive, the main body 100 of the buffer 10 is formed to have an attachment area in a shape corresponding to each corner of the disk drive. For example, in the case in which the disk drive is a right hexahedron, the main body 100 has an installation space having a section which is squared, i.e., at an approximately right angle, in order to match with the squared corner, in which the side face becomes triangular. Namely, the shape of the main body 100 approximates a cover formed by diagonally cutting across the face of the hexahedron. In this case, the thickness of the walls of the main body 100 is not more than approximately 0.5 mm, in consideration of providing the main body 100 to a small-sized disk drive.

In the case in which the shape of the disk drive is different, and the shape of the each corner is different, the main body 100 may have various shapes corresponding to the same. Also, the main body 100 may be provided to not only the corner of the disk drive, but any surface of the disk drive. For example, the main body 100 may be provided to the widest side surface, or may be provided at each surface of the disk drive to substantially cover the disk drive. The methods in which the main body 100 may be provided to the disk drive vary. For example, the main body 100 may be forcibly attached to each corner of the disk drive, or may be attached using a fastening material such as one or more bolts, tape, and adhesives.

It may be preferable, though not necessary, to manufacture the main body 100 using an incompressible material. Also, it may be preferable, though not necessary, to manufacture the main body 100 via injection molding using superior rubber material. Namely, the main body 100 may be molded at once by injection, including the protrusions 200 and the inner space 300 of the protrusions 200.

In the main body 100, a plurality of protrusions 200 are provided on the outer surface corresponding to the inner spaces 300, which are formed inwardly toward the protrusions 200 in the spaces opposite to the protrusions 200. The shape of the protrusion 200 may be variously embodied, but the preferable, though not necessary, shape of the protrusion is that of a hemisphere. Also, if the hemispheric protrusion 200 is formed at certain intervals on the main body 100, lower rigidity may be embodied.

Embodiment 2

Figure 4:
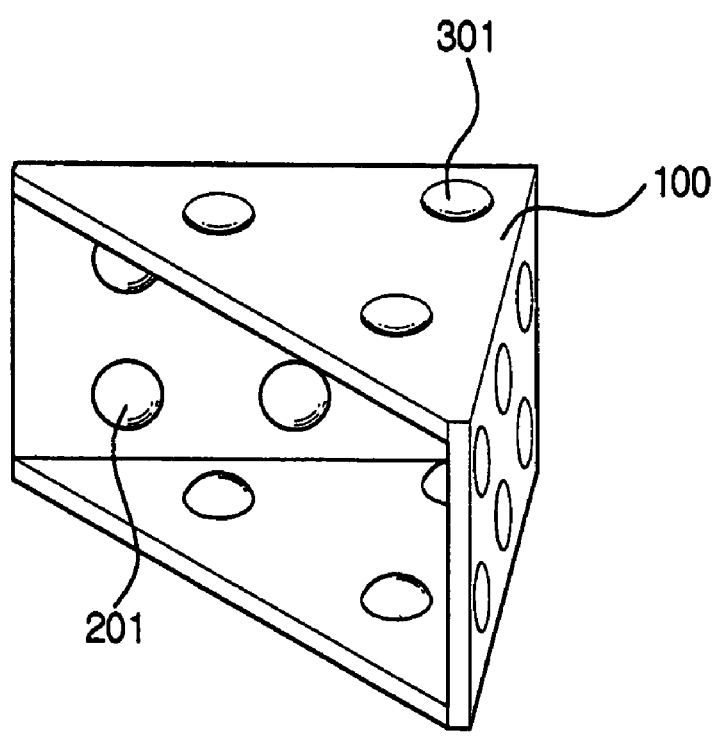
FIG. 4 is a perspective view illustrating the shape of a protrusion according to a second embodiment of the present invention.

FIG. 4 is a perspective view illustrating a shape of the buffer 10 according to a second embodiment of the present invention. As illustrated, the protrusion 201 may be provided on the inner surface of the buffer 10, and the inner space 301 may be on the outer surface of the buffer 10. In this case, the shape of the protrusion 201 and the inner space 301 may be variously formed.

Embodiment 3

Figure 5:
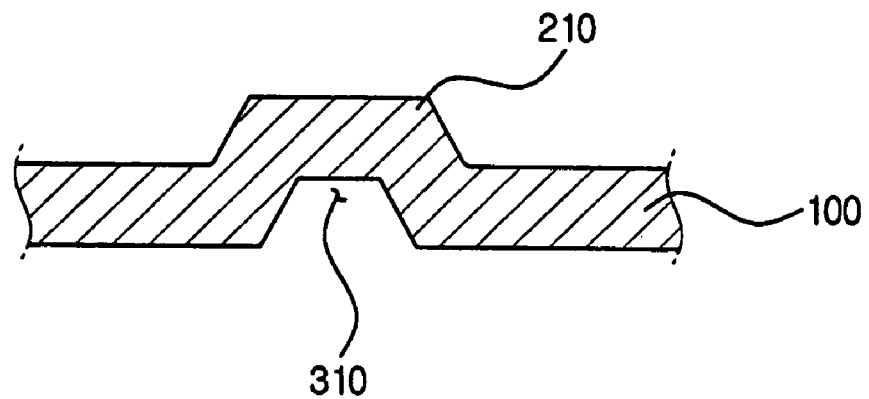
FIG. 5 is cross-sectional view illustrating the shape of a protrusion according to a third embodiment of the present invention.

FIG. 5 is a cross-sectional view illustrating a shape of a protrusion according to a third embodiment of the present invention. As illustrated, the shape of the protrusion 210 may be the shape of a hexahedron, and the inner space 310 may be identically formed as the shape of the protrusion 210. In addition, the protrusion may be in the shape of a pentahedron or other polyhedrons.

It is not necessary that the shape of a plurality of the protrusions 200 be uniform, and it may be possible to combine various shapes. Namely, a hemispheric protrusion and a protrusion in the shape of a hexahedron may be used in combination, and the number and the locations of the protrusions in each shape may be varied to reduce the rigidity of the buffer.

Embodiment 4

Figure 6:
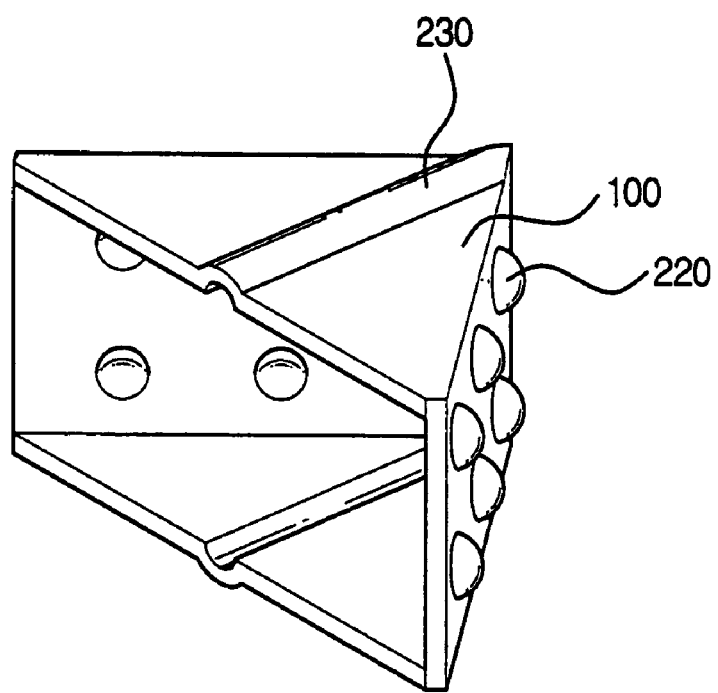
FIG. 6 is a cross-sectional view illustrating the shape of a protrusion according to a fourth embodiment of the present invention.

FIG. 6 is a cross-sectional view illustrating a shape of a protrusion according to a fourth embodiment of the present invention. As illustrated, one or more hemispheric protrusions 220 may be provided where the shape of the side surface of the main body 100 is rectangular, and one or more strip protrusions 230, having a hemicylindrical shape, with the inner space having the same shape, may be formed where the shape of the side surface of the main body 100 is a triangle.

Embodiment 5

Figure 7:
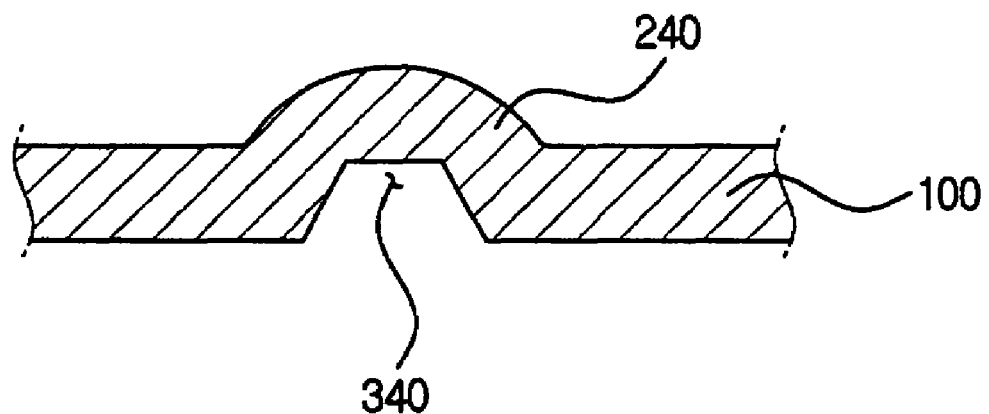
FIGS. 7 and 8 are cross-sectional views illustrating the shape of a protrusion and inner space according to a fifth embodiment of the present invention.
Figure 8:
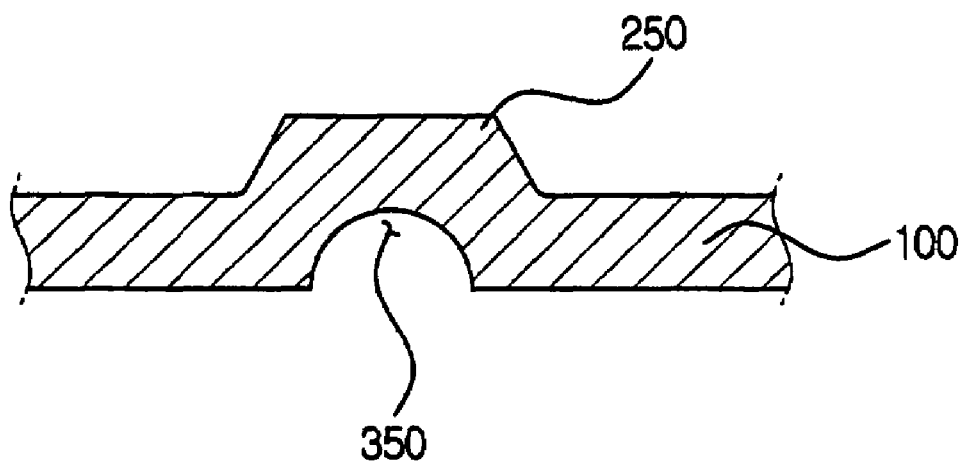

Also, the shape of the protrusions and the inner spaces may be variously formed relative to one another, as illustrated in FIGS. 7 and 8. FIGS. 7 and 8 are cross-sectional views illustrating various shapes of a protrusion and inner space according to the fifth embodiment of the present invention. Namely, as illustrated in FIG. 7, the shape of the protrusion 240 is the shape of a hemisphere, but the shape of the inner space 340 may be formed in the shape of a hexahedron. As illustrated in FIG. 8, a protrusion 250 is formed in the shape of a hexahedron but the shape of the section of the inner space 350 may be formed in the shape of a hemisphere.

Also, various shapes for the protrusions and inner spaces may be combined in the main body 100. As described above, the shape of the protrusions and inner spaces may be variously formed, and a shape that can reduce the rigidity of a buffer to a minimum may be selected. When the shape of the protrusion and the inner space are identically formed, thereby keeping the thickness of the buffer 10 uniform, stress concentration is avoided. Also, in the case of manufacturing by injection molding, if the shapes of the protrusions and the inner spaces are variously formed relative to one another, the shape, the amount, and the locations of the protrusions and inner spaces are designed, and then only one cast is needed to be manufactured, thereby reducing manufacturing cost and easily being mass-produced.

Embodiment 6

Figure 9:
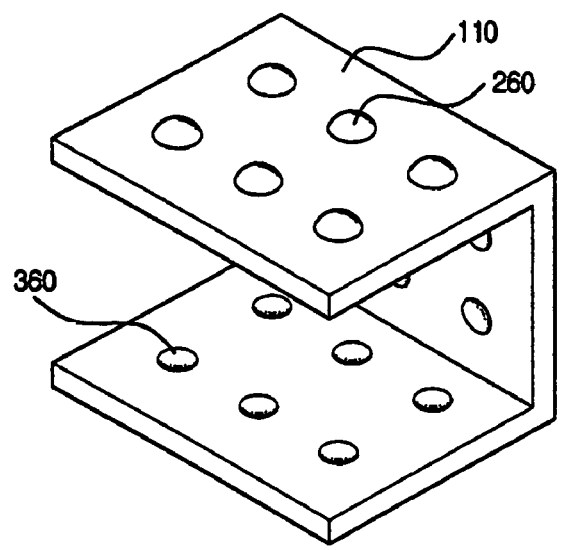
FIG. 9 is a perspective view illustrating a buffer according to a sixth embodiment of the present invention.

FIG. 9 is a perspective view illustrating a buffer according to a sixth embodiment of the present invention. As described above, the main body 110 may be provided not only to a corner, but also to a side surface of the disk drive 20. The main body 110 is formed to be provided to the side surface while covering part of the side surface, and the shape that is formed approximates the shape of a "U."

Not only the shape of a protrusion 260 and inner space 360 may be variously formed, but also the protrusion 260 may be protruded on the outer surface or protruded on the inner surface as in the second embodiment.

Hereinafter, the effect of the present invention will be described as follows.

The inner space allows the buffer to embody a low rigidity. In addition, though the main body and the protrusion may be formed of incompressible material, the action of bending may be achieved due to the inner space and an effect of broadening the surface area of the buffer to increase an area capable of accepting the strain.

Figure 10:
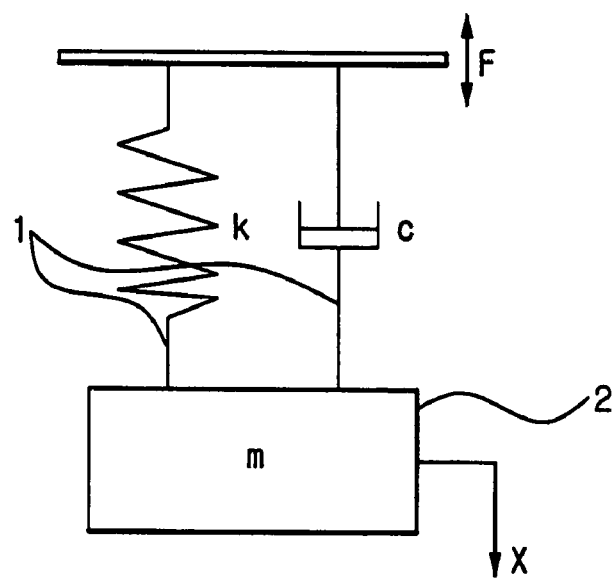
FIG. 10 is a diagram of modeling the disk drive and the buffer.

To describe the effect of the buffer in more detail by referring to FIG. 10, it may be modeled that a hard disk drive (HDD) 2 is a mass having the mass m, and a buffer 1 is a spring having a rigidity coefficient k and damping coefficient c. In the case in which the buffer 1 and HDD 2 are modeled as a second system, the equation of motion of the system with respect to an external input F is as shown in Equation 1:

$$m \cdot d2(x)/dt2 + c \cdot d(x)/dt + k \cdot x = F \qquad \text{[Equation 1]}$$

In this case, $W_n$ is the natural frequency of the system as shown in Equation 2:

$$Wn = \sqrt{k/m} \qquad \text{[Equation 2]}$$

As shown in Equation 2, the rigidity is in proportion to the natural frequency. Namely, in the case in which rigidity is reduced, the natural frequency is reduced, thereby improving the vibration characteristic.

In the system, in the case in which an external input whose size is $A_{in}$ and frequency $w_d$ is inputted, the external input F is as shown in Equation 3, and frequency ratio and transmissibility are as shown in Equations 4 and 5, respectively, $$F = Ain \, sinWd \cdot t \qquad \text{[Equation 3]}$$

$$\text{frequency ratio} = Wd/Wn \qquad \text{[Equation 4]}$$

$$\text{transmissibility} = Aout/Ain \qquad \text{[Equation 5]}$$

Figure 11:
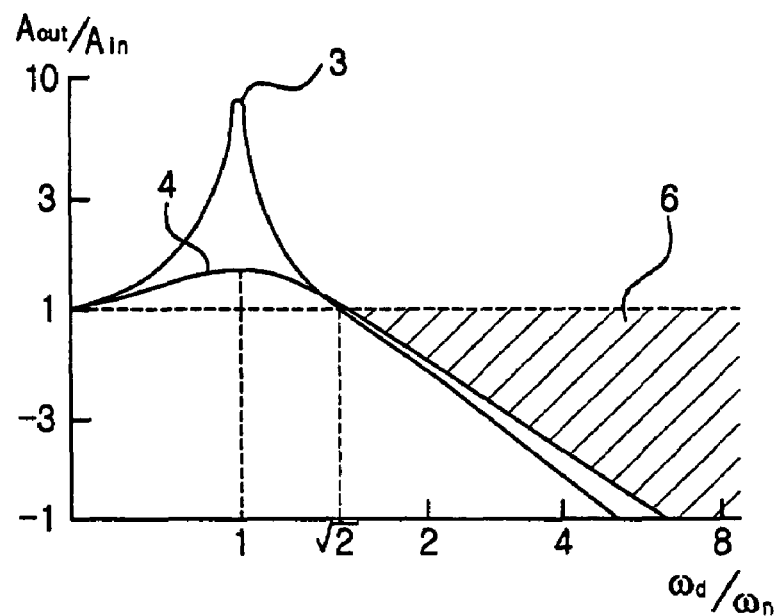
FIG. 11 is a graph illustrating the transmissibility with respect to frequency ratio according to the change of decrement.

In this case, Aout is the maximum amplitude of movement. The relation between the rigidity, or the natural frequency, and vibration characteristics is illustrated in detail in FIG. 11. In FIG. 11, the x axis indicates the frequency ratio, and the y axis indicates the transmissibility in a log scale. As illustrated, in the case of a buffer having a damping coefficient which is low, indicated by the identifier 3, transmissibility most severely spikes in the case of an external input identical with the natural frequency, namely, where the x axis is 1, and enters into a buffer zone 6 where the frequency ratio is √2. In the case of a buffer having a damping coefficient which is high, indicated by the identifier 4, transmissibility shows a similar shape. In this case, the buffer area indicates an area where the transmissibility is less than 1, in which the amount of the external impact Ain becomes less than the transmitted amount Aout.

Namely, in the case in which the frequency ratio is more than √2 regardless of the decrement value, it enters into the buffer area 6, and a greater buffer effect may be expected because the frequency ratio is in inverse proportion to the natural frequency. Also, since the natural frequency is in proportion to the rigidity, it is previously considered to lower the rigidity in designing a buffer.

Figure 12:
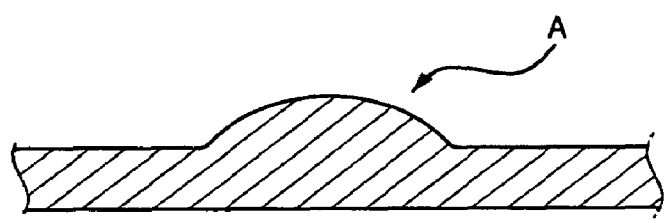
FIG. 12 illustrates a cross-sectional view illustrating a protrusion in the shape of a hemisphere and a structure in the shape of a hemisphere.
Figure 12:
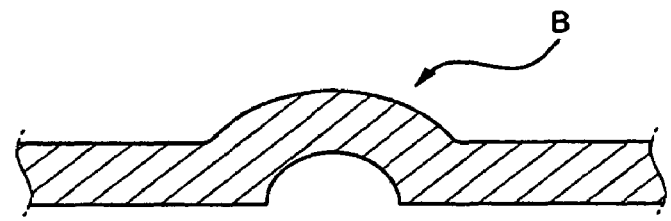

To illustrate the effects of the present invention, both shapes of buffers illustrated as (a) and (b) in FIG. 12 have been the subject of experimentation. A buffer A in which a protrusion in the shape of a hemisphere is formed without any formation of an inner space is illustrated in (a) of FIG. 12, and a buffer B in which a protrusion in the shape of a hemisphere and an inner space in the shape of a hemisphere are formed is illustrated in (b) of FIG. 12. In Table 1, the natural frequency of buffer A is compared with the natural frequency of buffer B. In this case, the radius of the hemisphere of the inner space is 0.6 mm.

TABLE 1

| | Thickness of buffer (mm) | Natural frequency of buffer (Hz) | Transmissibility (%) |
|---|---|---|---|
| Buffer whose inner space is not formed (A) | 1.5 | 860 | 100 |
| Buffer whose inner space is formed (B) | 0.6 | 492 | 57 |

Also, in Table 2, the natural frequency of a buffer C, in which a strip protrusion having the hemicylindrical shape is formed, and an inner space is not formed, is compared with the natural frequency of a buffer D in which a protrusion identical with the protrusion of buffer C is formed and an inner space of the same shape is formed. In buffer C, the radius of the inner space is 0.6 mm and the length of the strip is 4 mm.

TABLE 2

| | Thickness of buffer (mm) | Natural frequency of buffer (Hz) | Transmissibility (%) |
|---|---|---|---|
| Buffer whose inner space is not formed (C) | 1.5 | 1800 | 100 |
| Buffer whose inner space is formed (D) | 0.6 | 520 | 29 |

As illustrated in Tables 1 and 2, it is shown that the natural frequency is notably reduced, and the buffer function is improved, in the buffer in which the inner space is formed. Accordingly, though a buffer is manufactured in a small size in order to control the vibration of an ultra slim disk drive, the vibration may be sufficiently absorbed, and there is no need for a large installation space. Also, the thickness is small, and the rigidity is sufficiently small to reduce the natural frequency and improve the buffer function. Accordingly, if an ultra slim disk drive is manufactured and provided with the buffer in a portable device, the disk drive may be protected from vibrations.

Also, in the case in which an inner space is formed, if a main body and a protrusion are formed of an incompressible material, the action of bending may be achieved due to the inner space and the surface of the buffer being increased, thereby increasing the area to accept the strain.

According to the present invention, a buffer capable of protecting a disk drive from an external impact is provided, and buffers may be manufactured by injection molding, thereby easily being mass-produced while allowing a reduction in cost.

Also, the buffer has a low rigidity to reduce the natural frequency, thereby improving the buffer function. Since the buffer may be manufactured in a small size, the buffer is suitable for a portable device frequently exposed to external impact and having a limited space to install the buffer.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A buffer to be used with a disk drive, comprising:
   a main body attached to the disk drive; and
   a plurality of protrusions on the main body protruding in one direction, wherein inner spaces are respectively formed on opposite sides of the protrusions,
   wherein a side of the respective inner spaces, being opposite to the protruding direction, is opened, and sides of the respective inner spaces extending laterally with respect to the protruding direction are covered by the respective protrusions,
   wherein at least one of the protrusions is in a shape of a hemisphere.

2. The buffer of claim 1, wherein the inner space of at least one of the protrusions is in a shape of a hexahedron.

3. The buffer of claim 1, wherein the inner space of at least one of the protrusions is in the shape of a hemisphere.

4. The buffer of claim 1, wherein the main body comprises an attachment area in a shape corresponding to a corner of the disk drive, and the main body is attached to the corner and substantially covers the corner.

5. The buffer of claim 1, wherein the main body is formed to be attached to a portion of a side surface of the disk drive while covering part of the side surface of the disk drive.

6. The buffer of claim 1, wherein the buffer comprises a plastic resin.

7. The buffer of claim 1, wherein only the side of the respective inner spaces being opposite to the protruding direction is opened.

8. A buffer to be used with a disk drive, comprising:
   a main body attached to the disk drive; and
   a plurality of protrusions on the main body protruding in one direction, wherein inner spaces are respectively formed on opposite sides of the protrusions,
   wherein a side of the respective inner spaces, being opposite to the protruding direction, is opened, and sides of the respective inner spaces are covered by the respective protrusions,
   wherein at least one of the protrusions is in a shape of a hexahedron.

9. The buffer of claim 8, wherein the inner space of at least one of the protrusions is in the shape of a hexahedron.

10. The buffer of claim 8, wherein the inner space of at least one of the protrusions is in a shape of a hemisphere.

11. A buffer to be used with a disk drive, comprising:
a main body attached to the disk drive; and
a plurality of protrusions on the main body protruding in one direction,
wherein inner spaces are respectively formed on opposite sides of the protrusions,
wherein a side of the respective inner spaces, being opposite to the protruding direction, is opened, and sides of the respective inner spaces extending laterally with respect to the protruding direction are covered by the respective protrusions,
wherein the respective inner spaces of the protrusions are formed in a same shape as the protrusions, wherein a thickness of the buffer is approximately uniform.

12. The buffer of claim 1, wherein the protrusions extend from an inner surface or an outer surface of the main body.

13. A disk drive assembly comprising:
a disk drive having a plurality of corners with a side portion between the corners;
a bracket containing the disk drive; and
a plurality of buffers provided covering respective ones of the corners of the disk drive, the buffers comprising protrusions protruded in an inner or outer direction whereby inner spaces are respectively formed opposite to the protrusions, the buffer being in contact with the bracket, the side portion being uncovered by the buffers,
wherein a side of the respective inner spaces, being opposite to the protruding direction, is opened, and sides of the respective inner spaces extending laterally with respect to the protruding direction are covered by the respective protrusions.

14. The assembly of the claim 13, wherein at least one of the protrusions of the buffer is in a shape of a hemisphere, and the inner space of the at least one protrusion is also in the shape of a hemisphere.

15. The assembly of claim 13, wherein the buffer comprises an attachment area in a shape corresponding to a corner of the disk drive, and the buffer is attached to the corner to substantially cover the same.

16. The assembly of claim 13, wherein the buffer is formed to be attached to a portion of a side surface of the disk drive while covering part of the side surface of the disk drive.

17. The assembly of claim 13, wherein the protrusions of the buffer extend from an inner surface or an outer surface of the buffer.

18. A disk drive assembly comprising:
a disk drive having a plurality of corners with a side portion between the corners;
a bracket containing the disk drive; and
a plurality of buffers provided covering respective ones of the corners of the disk drive the buffers comprising protrusions protruded in an inner or outer direction whereby inner spaces are respectively formed opposite to the protrusions, the buffer being in contact with the bracket, the side portion being uncovered by the buffers,
wherein a side of the respective inner spaces, being opposite to the protruding direction, is opened, and sides of the respective inner spaces extending laterally with respect to the protruding direction are covered by the respective protrusions,
wherein at least one of the protrusions and respective inner spaces have a same shape, wherein a thickness of the buffer is approximately uniform.

19. A buffer to be used with a disk drive, comprising:
a main body provided to the disk drive, the main body having a top surface and a side surface corresponding respectively to top and side surfaces of the disk drive;
one or more protrusions extending from an inner or outer surface of the top surface and the side surface of the main body; and
one or more inner spaces corresponding to the respective protrusions;
wherein the inner spaces are formed on an opposite surface of the main body to the protrusions, and a side of the respective inner spaces, being opposite to the protruding direction, is opened, and sides of the respective inner spaces extending laterally with respect to the protruding direction are covered by the protrusions.

20. The buffer of claim 19, wherein at least one of the protrusions is in a shape of a hemisphere.

21. The buffer of claim 20, wherein the inner space of the at least one protrusion is in the shape of a hemisphere.

22. The buffer of claim 20, wherein the inner space of the at least one protrusion is in a shape of a hexahedron.

23. The buffer of claim 19, wherein at least one of the protrusions is in a shape of a hexahedron.

24. The buffer of claim 19, wherein the one or more protrusions are in a shape of a hemisphere, a polyhedron, a hemicylinder, or a combination thereof.

25. The buffer of claim 19, wherein the buffer comprises multiple portions respectively provided to substantially cover a plurality of corners of the disk drive.

* * * * *

UNITED STATES PATENT AND TRADEMARK OFFICE
CERTIFICATE OF CORRECTION

PATENT NO. : 7,710,717 B2 Page 1 of 1
APPLICATION NO. : 11/395259
DATED : May 4, 2010
INVENTOR(S) : Dong Ok Kwak et al.

It is certified that error appears in the above-identified patent and that said Letters Patent is hereby corrected as shown below:

Title page, item [57] Column 2 (Abstract), Lines 5-6, change "apposite" to --opposite--.

Signed and Sealed this

Twentieth Day of July, 2010

David J. Kappos
*Director of the United States Patent and Trademark Office*